United States Patent
Bao et al.

(10) Patent No.: US 9,286,451 B2
(45) Date of Patent: Mar. 15, 2016

(54) PASSWORD AUTHENTICATION

(71) Applicant: INTERNATIONAL BUSINESS MACHINES CORPORATION, Armonk, NY (US)

(72) Inventors: Sheng Hua Bao, Beijing (CN); Jian Chen, Beijing (CN); Zhong Su, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/186,129

(22) Filed: Feb. 21, 2014

(65) Prior Publication Data
US 2014/0245433 A1   Aug. 28, 2014

(30) Foreign Application Priority Data
Feb. 28, 2013   (CN) .......................... 2013 1 0064536

(51) Int. Cl.
*G06F 7/04*   (2006.01)
*G06F 12/00*   (2006.01)
*G06F 12/14*   (2006.01)
*G06F 13/00*   (2006.01)
*G06F 17/30*   (2006.01)
*G11C 7/00*   (2006.01)
*G06F 21/31*   (2013.01)
*G06F 21/36*   (2013.01)

(52) U.S. Cl.
CPC ................ *G06F 21/31* (2013.01); *G06F 21/36* (2013.01)

(58) Field of Classification Search
CPC ..... G06F 21/36; G06F 3/04886; G06F 21/31; G07F 7/1041
See application file for complete search history.

(56) References Cited

U.S. PATENT DOCUMENTS

| | | | |
|---|---|---|---|
| 2004/0257238 A1* | 12/2004 | De Jongh | 340/825 |
| 2008/0235772 A1* | 9/2008 | Janzen | 726/5 |
| 2009/0063850 A1* | 3/2009 | Joram et al. | 713/155 |
| 2009/0106825 A1* | 4/2009 | Cerruti et al. | 726/5 |

FOREIGN PATENT DOCUMENTS

| | | |
|---|---|---|
| CN | 101183941 | 5/2008 |
| JP | 2007310515 | 11/2007 |

* cited by examiner

*Primary Examiner* — David Garcia Cervetti
*Assistant Examiner* — Amie C Lin
(74) *Attorney, Agent, or Firm* — Cahn & Samuels, LLP (57) ABSTRACT

A method and apparatus for password authentication. The password authentication method, includes: generating a group of sequential candidate characters according to a user's operations to a keyboard, at least one key on the keyboard being associated with at least two characters, wherein the user's single operation of any one key results in characters associated with that key being selected as candidate characters with the same ranking; and authenticating whether a character string formed by the sequential candidate characters matches the password of the user. The password authentication apparatus for accomplishing the same.

13 Claims, 5 Drawing Sheets

| 700 |
| 701 | 702 |

| abcd | defg | ghij | jklm |
|------|------|------|------|
| mnop | pqrs | stuv | vwxy |
| yz12 | 2345 | 5678 | 890a |

PASSWORD AUTHENTICATION

CROSS-REFERENCE TO RELATED APPLICATIONS

This application claims priority under 35 U.S.C. §119 from Chinese Patent Application No. 201310064536.5 filed Feb. 28, 2013, the entire contents of which are incorporated herein by reference.

BACKGROUND OF THE INVENTION

1. Field of the Invention

The present invention generally relates to human-computer interaction technology, and more specifically, to a method and apparatus for password authentication.

2. Description of Related Art

With the development of computer and network technology, information security gets increasingly important. For example, many operations require users to login before execution. Password authentication is a login security mechanism that has been applied widely. A user is allowed to perform subsequent actions only after inputting a correct password. The password consists of English letters, Arabic numerals and/or other characters. The user can input the password by means of an input device like a keyboard. Alternatively, there have been proposed solutions of using a virtual keyboard to input a password. The virtual keyboard is an interactive tool drawn on a user interface (e.g., a graphical user interface) and having operable buttons for users to input characters. Some solutions further allow users to input on a user interface predefined graphics or paths as passwords.

In the above traditional password authentication mechanism, the password faces the risk of being stolen by other person. For example, a malicious third party might invade a computer system used by a user and install Trojans. Such Trojans illegally record, propagate or use a password inputted by the user via a user interface. In addition, a malicious third party might mount an image/video capture device like a camera or a video camera on a terminal device such as an Automatic Teller Machine (ATM) and the like. These devices can record the sequence that a user presses keys and thereby obtains a password inputted by the user. For another example, a password inputted by a user might be overseen and recorded by a bystander, which leads to the password exposure.

Therefore, there is a need in the art for a more secure password authentication mechanism, which allows a user to type in a password in a more secure manner without prejudicing the convenience and efficiency of user interaction.

SUMMARY OF THE INVENTION

In view of the above problems and other potential problems existing in the prior art, the present invention provides a method and apparatus for password authentication.

According to one aspect of the present invention, there is provided a password authentication method. The method comprises: generating a group of sequential candidate characters according to a user's operations to a keyboard, at least one key on the keyboard being associated with at least two characters, wherein the user's single operation of any one key results in characters associated with that key are selected as candidate characters with the same ranking; and authenticating whether one of character strings formed by the sequential candidate characters matches a password of the user.

According to another aspect of the present invention, there is provided a password authentication apparatus for. The apparatus comprises: a candidate character generating unit configured to generate a group of sequential candidate characters according to a user's operations to a keyboard, at least one key on the keyboard being associated with at least two characters, wherein the user's single operation of any one key results in characters associated with that key are selected as candidate characters with the same ranking; and a password authenticating unit configured to authenticate whether one of character strings formed by the sequential candidate characters matches a password of the user.

As is clear from the following description, according to the embodiment of the present invention at least one key on the keyboard may be associated with at least two characters. During operation the user's single operation of any one key will result in all characters associated with that key are selected as candidate characters with the same ranking, and the user does not need to indicate which specific character is desired. Thus, the user's operations to the keyboard will lead to a group of sequential candidate characters. If any one of character strings formed by these sequential candidate characters matches the password of the user, then it may be considered the user has inputted the correct password. In particular, the keyboard may be a virtual keyboard that is generated randomly. In this manner, even if a third party records, by illegal means, the sequence that the user operates keys, he/she cannot steal the password of the user. Therefore, the security of password authentication is improved, and the operation efficiency and convenience are ensured in the meanwhile.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
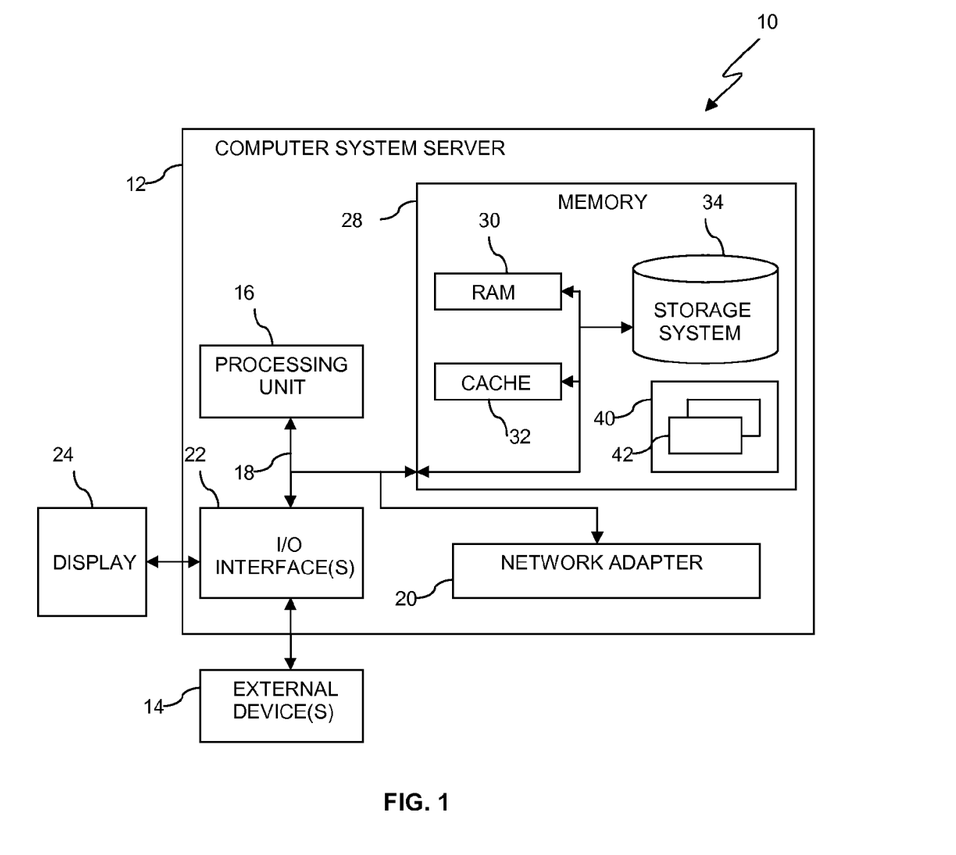
FIG. 1 shows an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
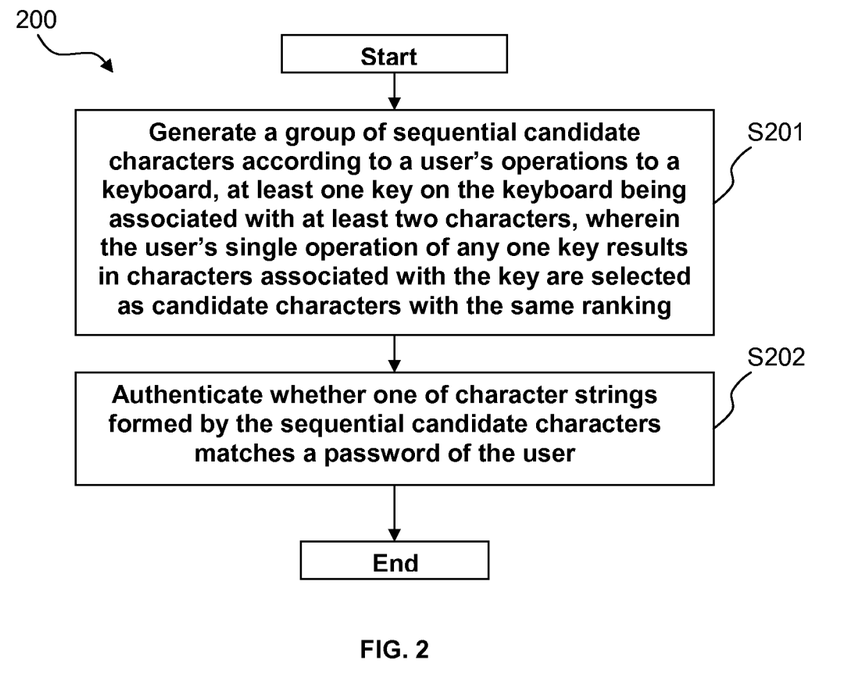
FIG. 2 shows a flowchart of a password authentication method 200 according to one exemplary embodiment of the present invention.

With reference to FIG. 2, this figure shows a flowchart of a password authentication method 200 according to one exemplary embodiment of the present invention. After method 200 starts, in step S201 a group of sequential candidate characters is generated according to a user's operations on a keyboard.

According to some embodiments of the present invention, the keyboard operated in step S201 may be a virtual keyboard. In such embodiments, prior to step S201 there may be an optional step of generating and presenting to the user a virtual keyboard, called a first virtual keyboard for example. As is known to those skilled in the art, the virtual keyboard refers to an interactive tool generated in a computer system and displayed on a user interface to be operated by users. The virtual keyboard has one or more interactive elements called "virtual keys" or "keys" for short each being associated with predetermined characters. By operating (e.g., pressing or clicking) a key on the virtual board, characters associated with the key can be inputted to the computer system.

Note in the context of the present invention the characters may comprise various characters used for forming passwords, such as English letters, Arabic numerals, mathematical symbols, punctuations, slashes, backslashes, asterisks, number signs, etc. The scope of the present invention is not limited in this regard.

According to the embodiment of the present invention, the virtual keyboard may be always presented in the user interface. Alternatively, the virtual keyboard may be generated and presented in response to the password authentication operation. For example, the virtual keyboard may be generated and presented when the user places an interactive focus (e.g., a cursor) in a field for inputting passwords. For another example, the user may interactively indicate the virtual keyboard is presented. The scope of the present invention is not limited in this regard.

Figure 3:
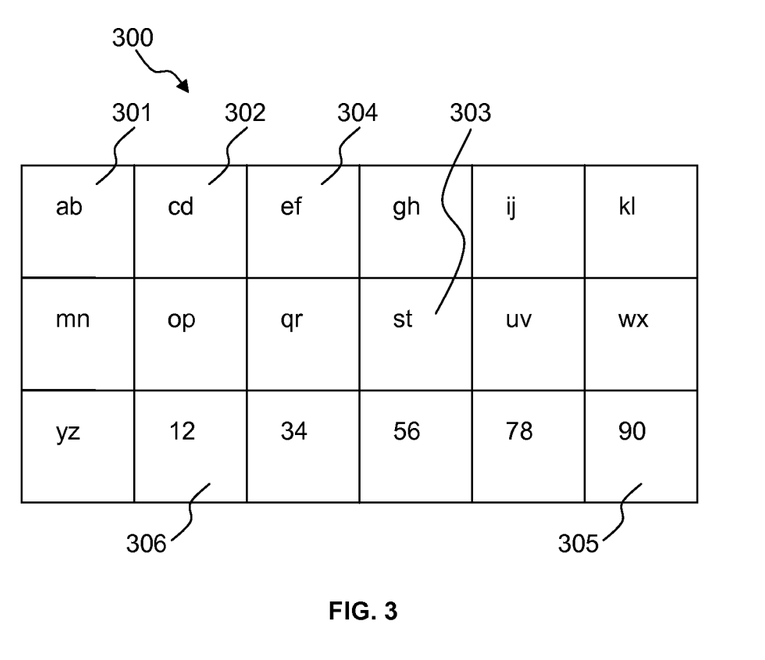
FIGS. 3-7 show schematic block diagrams of virtual or entity keyboards 300-700 according to one exemplary embodiment of the present invention, respectively.

According to the embodiment of the present invention, at least one key on the virtual keyboard is associated with at least two characters. As an example, in some embodiment each key on the virtual keyboard is associated with at least two characters. FIG. 3 shows such an exemplary virtual keyboard 300. Alternatively, only a specific number of keys on the virtual board are respectively associated with at least two characters, whereas other keys each are associated with a single character. The scope of the present invention is not limited in this regard.

Figure 4:
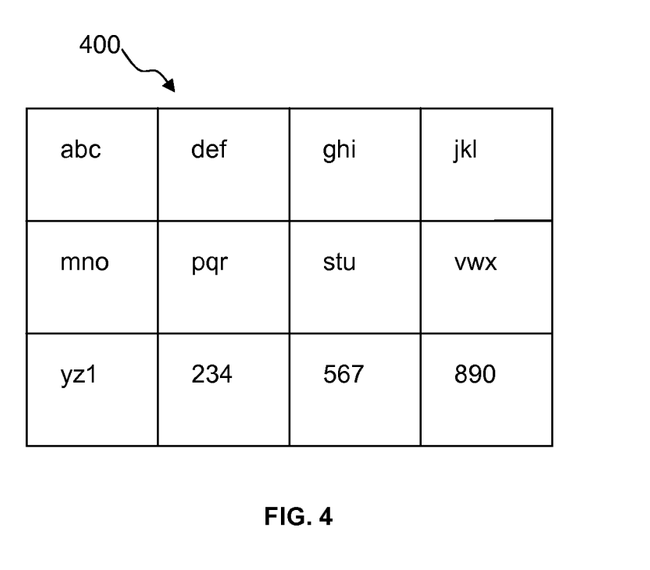

According to the embodiment of the present invention, the virtual keyboard may be generated randomly. For example, in some embodiment the key layout of the virtual keyboard may be generated randomly. In other words, every time the virtual keyboard is generated and presented to the user, keys are randomly distributed on the keyboard, which results in different layouts of the keyboard. For example, suppose when the user inputs the password at a certain time, the virtual keyboard as shown in FIG. 3 is presented to the user. When the user wants to input the password again, what is presented to the user may be a virtual keyboard 400 as shown in FIG. 4. It can be seen that as compared with the example in FIG. 3, virtual keyboard 400 shown in FIG. 4 changes to a 3-row 4-column layout from a 3-row 6-column layout. It is to be understood the embodiment shown in FIG. 4 is merely exemplary but not limiting. Keys on the virtual keyboard may be organized in any layout.

Figure 5:
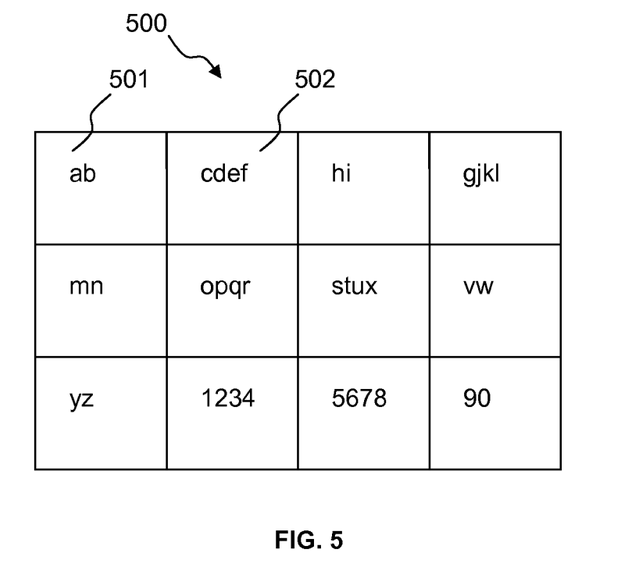

Alternatively or additionally, according to the embodiment of the present invention associations between keys on the virtual keyboard and characters may be generated randomly or dynamically. For example, in some embodiment every time the virtual keyboard is generated, the number of characters associated with each key is determined randomly. That is, one key may be associated with any appropriate number of characters. As an example, in virtual keyboard 300 shown in FIG. 3, each key is associated with two characters; in virtual keyboard 400 shown in FIG. 4, each key is associated with three characters. Moreover, in the same virtual keyboard that is generated randomly, each key may be associated with a different number of characters. FIG. 5 shows such an exemplary keyboard 500, wherein a key 501 is associated with two characters ("a" and 'b") while a key 502 is associated with four characters ("c" to "f").

Figure 6:
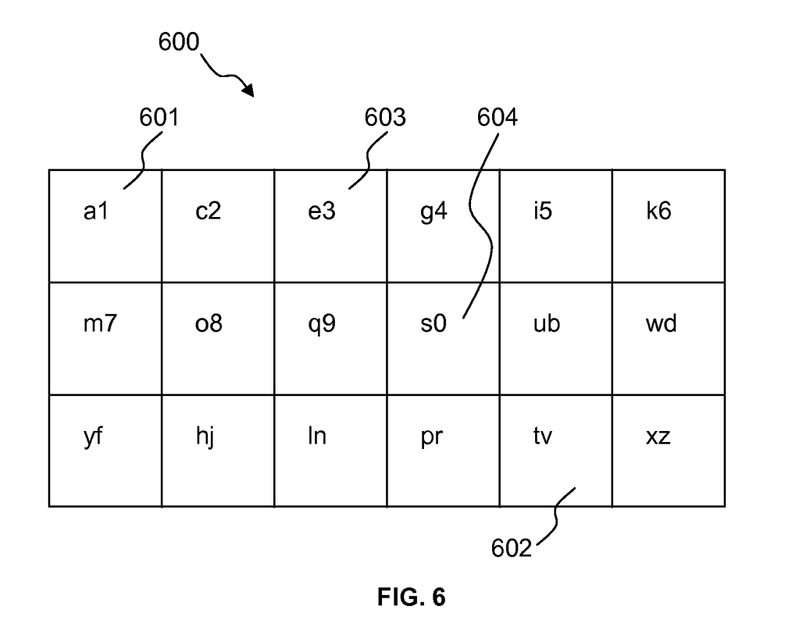

Alternatively or additionally, characters associated with each key may change at random. In other words, the randomly generating key-character associations may comprise randomly assigning characters to various keys on the virtual keyboard. As an example, still suppose when the user inputs the password at a certain time, presented to the user is virtual keyboard 300 as shown in FIG. 3. Later when the user wants to input a password again, a virtual keyboard 600 as shown in FIG. 6 may be presented to the user. It can be seen that characters associated with keys on the virtual keyboard shown in FIG. 6 change as compared with the example of FIG. 3. For example, keys 301 and 601 which are at the same location are associated with characters "ab" and "al," respectively.

The randomly associating keys with characters may be implemented using various appropriate technical means. For example, in some embodiment suppose the number of keys on the virtual keyboard is n (n is a natural number), then a random integer in the range of [0, n−1] may be set with respect to each character, and a character is mapped to a corresponding key according to the generated random number. Any other appropriate means may also be used to build random mapping relationships between characters and keys. The scope of the present invention is not limited in this regard.

Figure 7:
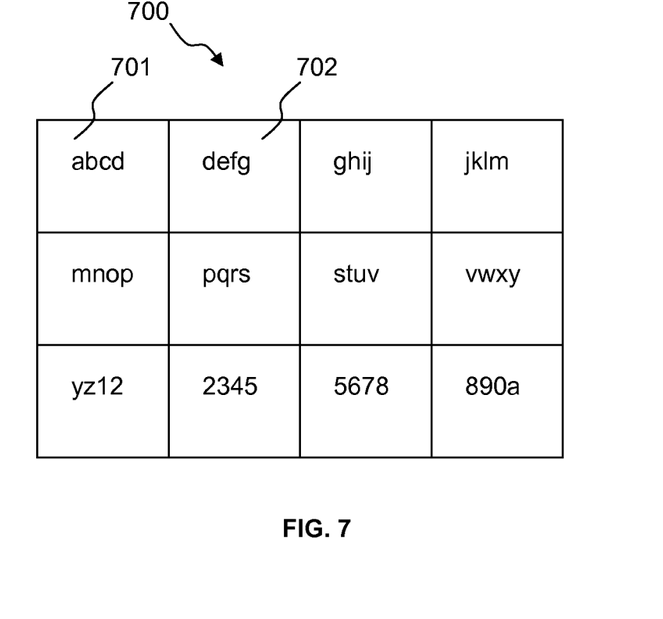

In addition, according to some embodiments of the present invention one identical character may be associated with two or more keys on the keyboard. In other words, associated characters of two or more keys may have an intersection. For example, in a keyboard 700 shown in FIG. 7, a character "d" is associated with keys 701 and 702. In this embodiment, when the user wants to input the character "d," he/she may press key 701 or key 702. Of course, it is to be understood that some but not all characters are associated with at least two keys on the keyboard.

The optional features that have been described above in conjunction with FIGS. 4-6 help to improve the security of password authentication, which will be detailed below. However, shown in FIGS. 4-7 are merely several exemplary embodiments of the present invention, which should be construed as limiting the scope of the present invention.

Note according to the embodiment of the present invention what is operated by the user may be a physical entity keyboard such as a keyboard on the ATM but is not necessarily a virtual keyboard. In fact, any keyboard can be used in conjunction with the present invention, so long as at least one key on the keyboard is associated with at least two characters. Therefore, the step of generating and presenting a virtual keyboard is merely an optional step.

Accordingly, the keyboards shown in FIGS. 3-7 may also represent entity keyboards used in conjunction with the embodiment of the present invention. The features that have been described above with reference to FIGS. 3-7 are also suitable for entity keyboards. For example, each of one or more characters may be associated with at least two keys on the entity keyboard, etc.

Still with reference to step S201 of method 200, during operation every time the user presses any key on the keyboard, a character associated with the key is selected as a candidate character. Note candidate characters are sequential, i.e., a character associated with a key that is pressed earlier is prior to a character associated with a key that is pressed later.

In particular, according to the embodiment of the present invention, once the user presses any given key, all characters associated with the key are selected as candidate characters with the same ranking. It is to be understood that the operation mechanism according to the embodiment of the present invention differs from the prior art substantially. Specifically, in the prior art when the user presses a single key associated with a plurality of characters, he/she needs to indicate, in some way, which particular character associated with the key is desired. In common existing technical solutions, this may be implemented by successively pressing the key. For example, when the user presses a key for the first time, the first character associated with the key is selected. If the user presses the key once more in an enough short interval, then the second character is selected to cover the first character that is selected previously, and so on and so forth. Take keyboard 300 shown in FIG. 3 as an example, according to the above operation mechanism in the prior art, if the user wants to input a character string "bd," then he/she needs to successively press key 301 twice and then successively press a key 302 twice.

On the contrary, according to the embodiment of the present invention, to input the character string "bd," the user only needs to press key 301 once and then press key 302 once. After the user presses key 310 once, both characters "a" and 'b" associated with key 301 are selected as candidate characters, and they have the same ranking (denoted by serial number "1," for example). Subsequently, the user presses key 302 once. In response, both characters "c" and "d" associated with key 302 are selected as candidate characters, and they also have the same ranking (denoted by serial number "2," for example). This operation mechanism can significantly improve the security of password authentication operation, which will be detailed below in conjunction with a concrete example.

Returning to FIG. 2, for example, a password is inputted in response to the user's indication, and then method 200 proceeds to step S202. In step S202, it is authenticated whether the password of the user matches at least one character among character strings formed by the candidate characters. According to the embodiment of the present invention, as long as any one character string formed by the candidate characters matches the password of the user, it may be considered the user has inputted the correct password.

To explain principles and advantages of the embodiment according to the present invention, an example is considered below. Suppose the user wants to input the password "test01." Take keyboard 300 shown in FIG. 3 as an example. In the prior art, to input the password, the user needs to operate keyboard 300 as below: press a key 303 twice, press a key 304 once, press key 303 once, press key 303 twice, press a key 305 twice, and press a key 306 once. The operation will result in a unique character string. However, if a malicious third party records the user's above operation by means of a Trojan, image capture or peeping, then he/she may easily obtain the password of the user.

Unlike this, according to the embodiment of the present invention, to input the password "test01," the user may press each of the following key on keyboard 300 once: key 303, key 304, key 303, key 303, key 305 and key 306. Accordingly, sequential candidate characters comprise:

{("s", "t"), ("e", "f"), ("s", "t"), ("s", "t"), ("9", "0"), ("1", "2")} where the candidate characters are sorted according to the user's operation sequence, characters within the same parentheses are associated with the same key and thus have the same ranking.

Since the user no longer needs to indicate which associated character is desired every time he/she presses a key, the sequential candidate characters resulting from pressing keys may form a plurality of character strings to be matched. Specifically, according to the embodiment of the present invention, the candidate characters may form character strings in sequence, such that one and only one of candidate characters in the same ranking is contained in a character string. In the above-described example, the set of sequential candidate characters may form a plurality of (64 in this example) character strings, such as "sess91," "sfts02," "tess 92," "test01," etc.

In one example, in step S202 as long as it is determined any one of the character strings matches the password of the user, it is considered the user has inputted the correct password. In this manner, during operation the user can avoid explicitly indicating characters that are contained in the password. Thus, even if a malicious third party records the user's pressing sequence by a Trojan, image capture, peeping or any other means, he/she cannot determine the password of the user. According to the embodiment of the present invention, the coupling closeness between the back end where the password of the user is recorded and the front end (the keyboard and keys thereon) where the user performs the operation of password inputting is decreased, so that the risk that the password of the user is stolen is reduced effectively and the security of the password of the user authentication is improved.

Moreover, as described above, in some optional embodiments of using a virtual keyboard, key-character associations on the virtual keyboard may be generated randomly. This further improves the security of password authentication. Consider such a concrete example: after the user inputs a password by using virtual keyboard shown in FIG. 3, if any person wants to input the password again, key-character associations on the virtual keyboard will change randomly, for example, changing to virtual keyboard 600 as shown in FIG. 6. At this point, the operation of inputting the password "test01" changes to sequentially pressing each of the following keys once: a key 602, a key 603, a key 604, key 602, key 604 and key 601. It is to be understood that according to the operation to virtual keyboard 300, a malicious third party cannot input the correct password by virtual keyboard 600. Thus, the malicious third party cannot achieve illegal login by repeating the user's operation. Likewise, the security of password authentication may be further improved by changing the layout of the virtual keyboard and/or the number of characters associated with a key.

In addition, by using a virtual keyboard (e.g., virtual keyboard 700 shown in FIG. 7) where one identical character is associated with two or more keys, the user can select different keys to input the same character during operation, which further reduces the risk that the password of the user is stolen.

In particular, according to some embodiments of the present invention, the password may be stored in encrypted form on the back end, thereby avoiding saving the password in plaintext. While matching, character strings formed by the candidate characters may be compared with the encrypted password on the basis of hash (e.g., multiple combined hashes) map. In this manner, the security of password authentication can be improved further. Hash map is well known in the art and thus not detailed here.

Returning to FIG. 2, in step S202 if it is determined the user has inputted the correct password, then the user is allowed to log in directly according to some embodiments. Alternatively, in some embodiments of using a virtual keyboard, method 200 may be performed for any given times. Specifically, in these embodiments if it is authenticated one of character strings formed by the sequential candidate characters matches the password of the user, then another virtual keyboard (e.g., denoted as "a second virtual keyboard") may be generated so as to require the user to input the password again. Features and operations of the second virtual keyboard are similar to those of the first virtual keyboard that is used previously.

In particular, the second virtual keyboard may differ from the first virtual keyboard in the layout, key-character associations and/or other respects. As described above, according to an optional embodiment of the present invention, every time the virtual keyboard is generated and presented, the keyboard layout and/or key-character associations may be generated randomly. In such an embodiment, naturally the second and first virtual keyboards have different layouts and/or key-character associations. Also by setting the generating mechanism of virtual keyboards, it is ensured compulsorily that the second virtual board differs from the first virtual keyboard. The scope of the present invention is not limited in this regard.

The way the user operates the second virtual keyboard is similar to that described with reference to the first virtual keyboard: operating the second virtual keyboard to generate a second group of sequential candidate characters, wherein the user's single operation of any key results in that all characters associated with that key are selected as candidate characters with the same ranking; and authenticating whether at least one character string formed by the second group of sequential candidate characters matches the password of the user.

Practice has proven that where a third party does not know the password, the probability of using different virtual keyboards to input the correct password twice in a succession approaches zero. Therefore, by executing the steps of method 200 several times and changing the used virtual keyboard, it is possible to more effectively prevent the third party's attempt to illegally log in and further improve the security of password authentication. It is to be understood that the repetitive execution of method 200 is optional. Moreover, the times method 200 is repeated may change according to a concrete demand. The scope of the present invention is not limited in this regard.

Returning to FIG. 2, in step S202 if none of character strings formed by the sequential candidate characters inputted by the user matches the password of the user, then it is determined the password inputted by the user is wrong. In this case, the user's login is rejected directly. Alternatively, according to some embodiments, a new virtual keyboard may be generated and the user is required to input the password once more (this process is called "fail & retry"). The newly generated virtual keyboard may differ from the previously used virtual keyboard (in respects of key-character associations and/or layout, for example). The fail & retry may be implemented for predetermined times. If the user still does not input the correct password after implementing the fail & retry for predetermined times, then corresponding security measures may be taken, e.g., freezing the user's account, requiring the user to authenticate his/her identity in other manner, notifying the user of wrong password inputting by various communication means, etc.

It is to be understood that to set an upper threshold of fail & retry might be helpful. If a third party records the user's operation to the virtual keyboard, since he/she does not know the exact password, he/she must perform times of operations trying permutation and combination of characters associated with keys pressed by the user. In this case, by setting an appropriate threshold of fail & retry, it is possible to further reduce the risk the third party illegally acquire the password of the user.

Method 200 ends after step S202.

Figure 8:
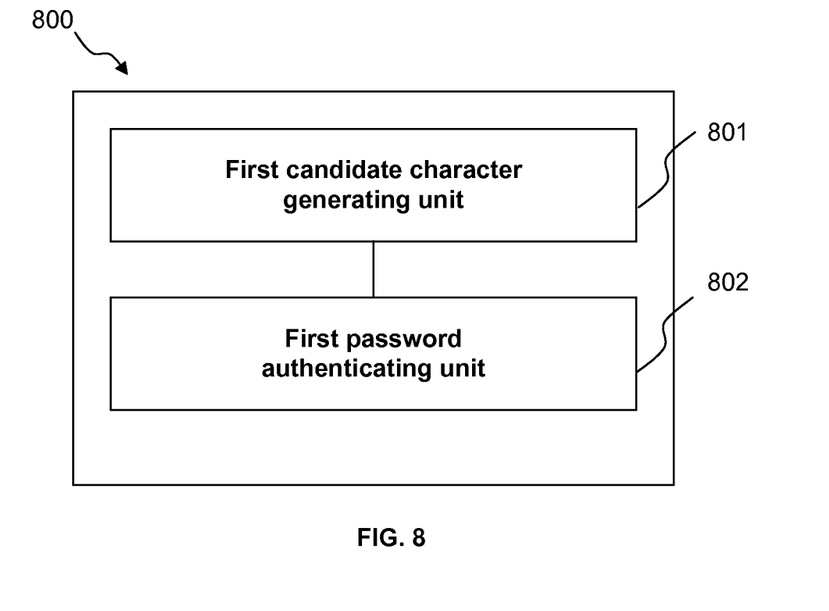
FIG. 8 shows a schematic block diagram of a password authentication apparatus 800 according to one exemplary embodiment of the present invention.

With reference to FIG. 8 below, this figure shows a block diagram of a password authentication apparatus 800 according to one exemplary embodiment of the present invention. As shown in the figure, password authentication apparatus 800 comprises: a first candidate character generating unit 801 configured to generate a group of sequential candidate characters according to a user's operations to a keyboard, at least one key on the keyboard being associated with at least two characters, wherein the user's single operation of any one key results in characters associated with that key are selected as candidate characters with the same ranking; and a first password authenticating unit 802 configured to authenticate whether one of character strings formed by the sequential candidate characters matches the password of the user.

According to some optional embodiments, apparatus 800 may further comprise: a first virtual keyboard generating unit configured to generate a first virtual keyboard as the keyboard. In such embodiments, optionally the first virtual keyboard generating unit comprises at least one of: a key-character associations generating unit configured to randomly generate associations between keys on the first virtual keyboard and characters; and a layout generating unit configured to randomly generate a key layout of the first virtual keyboard. According to some optional embodiments, the key-character associations generating unit comprises at least one of: a unit configured to assign characters to keys on the first virtual keyboard; and a unit configured to randomly determine the number of characters associated with a key on the first virtual keyboard.

According to some optional embodiments of the present invention, apparatus 800 may further comprise: a second virtual keyboard generating unit configured to generate a different second virtual keyboard in response to one of character strings formed by the sequential candidate characters matching the password of the user, at least one key on the second virtual keyboard being associated with at least two characters; a second candidate character generating unit configured to generate a second group of sequential candidate characters according to the user's operations to the second virtual keyboard, wherein the user's single operation of any one key on the second virtual keyboard results in characters associated with that key are selected as candidate characters having same ranking; and a second password authenticating unit configured to authenticate whether one of character strings formed by the second group of sequential candidate characters matches the password of the user.

According to some optional embodiments, the password of the user is stored in encrypted form, and the first password authenticating unit comprises: a unit configured to authenticate based on a hash map whether one of character strings formed by the sequential candidate characters matches the password stored in encrypted form.

According to some optional embodiments, each key on the keyboard is associated with at least two characters. Alternatively or additionally, according to some optional embodiments, a single character may be associated with at least two keys on the keyboard.

For the clarity purpose, FIG. 8 does not show optional units or sub-units contained in apparatus 800. It is to be understood that the various units or sub-units contained in apparatus 800 respectively correspond to the steps of method 200 described above with reference to FIG. 2. Hence, all features and operations described with respect to method 200 are also applicable to apparatus 800, which are not detailed here.

Moreover, the division of apparatus 800 into the units or sub-units is not limiting but exemplary, which is intended to logically describe main functions or operations. For example, the function of a single unit shown in FIG. 8 may be performed by a plurality of units. Instead, a plurality of units shown in this figure may be implemented by single means. The scope of the present invention is not limited in this regard.

In particular, the units and sub-units contained in apparatus 800 may be implemented in various forms, including software, hardware, firmware or any combination thereof. For example, according to some embodiments of the present invention each unit of apparatus 800 may be implemented using software and/or firmware modules. At this point, these software units may achieve opti-electronic conversion or electro-optical conversion by calling other means or devices. Alternatively or additionally, the units of apparatus 800 may also be implemented using hardware. For example, each unit of apparatus 800 may be implemented as an integrated circuit (IC) chip, an application-specific integrated circuit (ASIC), a field programmable gate array (FPGA), or a system on chip (SOC). Other forms that are currently known or to be developed in future are also feasible. The scope of the present invention is not limited in this regard.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A password authentication method, comprising:
   generating a first virtual keyboard as a keyboard;
   generating a group of sequential candidate characters according to a user's operations to the keyboard, at least one key on the keyboard being associated with at least two characters, wherein the user's single operation of any one key results in characters associated with that key being selected as candidate characters with the same ranking;
   authenticating whether a character string formed by the sequential candidate characters matches a password of the user;
   generating a different second virtual keyboard in response to a character string formed by the sequential candidate characters matching the password of the user, at least one key on the second virtual keyboard being associated with at least two characters, the second virtual keyboard having a different character layout than the first virtual keyboard such that character combinations on keys of the second virtual keyboard are different from character combinations on keys of the first virtual keyboard, wherein each key on the second virtual keyboard is associated with a different number of characters;
   generating a second group of sequential candidate characters according to the user's operations to the second virtual keyboard, wherein the user's single operation of any one key on the second virtual keyboard results in characters associated with that key are selected as candidate characters having same ranking; and
   authenticating whether one of character strings formed by the second group of sequential candidate characters matches the password of the user.

2. The method according to claim 1, wherein the step of generating a first virtual keyboard as the keyboard comprises at least one of:
   randomly generating associations between keys on the first virtual keyboard and characters; and
   randomly generating a key layout of the first virtual keyboard.

3. The method according to claim 2, wherein the step of randomly generating associations between keys on the first virtual keyboard and characters comprises at least one of:
   randomly assigning characters to keys on the first virtual keyboard; and randomly determining the number of characters associated with a key on the first virtual keyboard.

4. The method according to claim 1, wherein a single character is associated with at least two keys on the keyboard.

5. The method according to claim 1, wherein:
the password of the user is stored in encrypted form, and
the step of authenticating whether one of character strings formed by the sequential candidate characters matches the password of the user comprises: authenticating based on a hash map whether a character string formed by the sequential candidate characters matches the password stored in encrypted form.

6. The method according to claim 1, wherein each key on the keyboard is associated with at least two characters.

7. The method according to claim 1, wherein the user's operations to the keyboard and the user's operations to the second virtual keyboard result in characters matching the password of the user to be entered twice.

8. A password authentication apparatus, comprising:
a first virtual keyboard generating unit configured to generate a first virtual keyboard as the keyboard;
a first candidate character generating unit configured to generate a group of sequential candidate characters according to a user's operations to the keyboard, at least one key on the keyboard being associated with at least two characters, wherein the user's single operation of any one key results in characters associated with that key are selected as candidate characters with the same ranking;
a first password authenticating unit configured to authenticate whether a character string formed by the sequential candidate characters matches a password of the user;
a second virtual keyboard generating unit configured to generate a different second virtual keyboard in response to a character string formed by the sequential candidate characters matching the password of the user, at least one key on the second virtual keyboard being associated with at least two characters, the second virtual keyboard having a different character layout than the first virtual keyboard such that character combinations on keys of the second virtual keyboard are different from character combinations on keys of the first virtual keyboard, wherein each key on the second virtual keyboard is associated with a different number of characters;
a second candidate character generating unit configured to generate a second group of sequential candidate characters according to the user's operations to the second virtual keyboard, wherein the user's single operation of any one key on the second virtual keyboard results in characters associated with that key are selected as candidate characters having same ranking; and
a second password authenticating unit configured to authenticate whether a character string formed by the second group of sequential candidate characters matches the password of the user.

9. The apparatus according to claim 8, wherein the first virtual keyboard generating unit comprises at least one of:
a key-character associations generating unit configured to randomly generate associations between keys on the first virtual keyboard and characters; and
a layout generating unit configured to randomly generate a key layout of the first virtual keyboard.

10. The apparatus according to claim 9, wherein the key-character associations generating unit comprises at least one of:
a unit configured to randomly assign characters to keys on the first virtual keyboard; and
a unit configured to randomly determine the number of characters associated with a key on the first virtual keyboard.

11. The apparatus according to claim 9, wherein a single character is associated with at least two keys on the keyboard.

12. The apparatus according to claim 9, wherein:
the password of the user is stored in encrypted form; and
the first password authenticating unit comprises: a unit configured to authenticate based on a hash map whether one of character strings formed by the sequential candidate characters matches the password stored in encrypted form.

13. The apparatus according to claim 9, wherein each key on the keyboard is associated with at least two characters.

* * * * *